March 8, 1960  G. G. OUTTERSON  2,927,455

MEASUREMENT AND CONTROL SYSTEM

Filed Dec. 19, 1955  2 Sheets-Sheet 1

INVENTOR.
GEORGE G. OUTTERSON
BY
Bates, Teare & McBean
ATTORNEYS

March 8, 1960  G. G. OUTTERSON  2,927,455
MEASUREMENT AND CONTROL SYSTEM
Filed Dec. 19. 1955  2 Sheets-Sheet 2

INVENTOR.
GEORGE G. OUTTERSON
BY
Bates, Teare & McBean
ATTORNEYS

United States Patent Office 2,927,455
Patented Mar. 8, 1960

2,927,455
MEASUREMENT AND CONTROL SYSTEM
George G. Outterson, East Cleveland, Ohio
Application December 19, 1955, Serial No. 554,080
14 Claims. (Cl. 73—37.7)

This invention relates generally to an improved arrangement for accurately determining the distance between two points and more particularly relates to the remote determination of the distance between such points independent of any fixed reference.

Physical measurements are usually dependent upon a fixed or otherwise known reference and any displacement or change in the reference results in the introduction of an error in the measurement. This is especially true in physically measuring a moving subject and the error may be compounded when both the subject and the reference are moving relative to each other during measurement. Exemplary of such a situation is the measurement or control of the thickness of strip or sheet material passing over a movable supporting surface such as a calender roll. Such measurement is further complicated when either the subject or its support or both cannot be practicably contacted by a reference probe.

Accordingly, it is a principal object of this invention to provide an improved arrangement for accurately determining the distance between two points independent of any fixed reference.

Another object of this invention is to provide an improved arrangement for remotely measuring and/or controlling the physical distance between two relatively movable points independent of any fixed reference.

Briefly, in accordance with this invention the physical distance between selected points on opposed surfaces respectively of strip or sheet material passing over a support may be accurately determined independent of any fixed reference by independently following each surface and indicating the distance between the followers. One or both of the followers may be remotely spaced from the corresponding surface and operate to produce a signal quantitatively indicative of its position relative to that surface. If either or both followers do not respond linearly to a change in their position relative to the corresponding surface, they are made to produce a compensating signal which controls a follower positioning mechanism to maintain the spacing between the follower and its corresponding surface constant.

The remote follower may be a magnetic coil which generates an electrical signal corresponding to the proximity of a magnetically susceptible material defining one surface or, it may be a stream of fluid which is restricted by one of the surfaces whose relative position creates a corresponding back pressure which can be measured or otherwise translated into a corresponding electrical signal. Both types of remote followers may be combined to measure or control the thickness of a non-magnetic material on a magnetically susceptible support.

The preferred form of this invention is shown for the purpose of illustration as applied to the measurement of thickness of sheet rubber passing over a moving calender roll or platen made of magnetically susceptible material. In this environment it is not practicably feasible to utilize direct contact followers because of factors like resilience of the rubber material, the speed of operation, and accessibility to the respective surfaces. The preferred arrangement is thus described in its application to a magnetically susceptible support for the measurement of the thickness of a non-magnetic material having a relatively smooth surface. It will be understood, however, that the system may be applied to the measurement of magnetic materials simply by providing a non-magnetic support and interchanging the application of the magnetic and fluid pressure portions of the system. For ease of understanding and description, the overall system shown in Fig. 1 of the drawings will be first described and the mechanical portions of that system will be described in greater detail in connection with their mechanical counterparts shown in the other figures of the drawings.

*The system*

Figure 1:
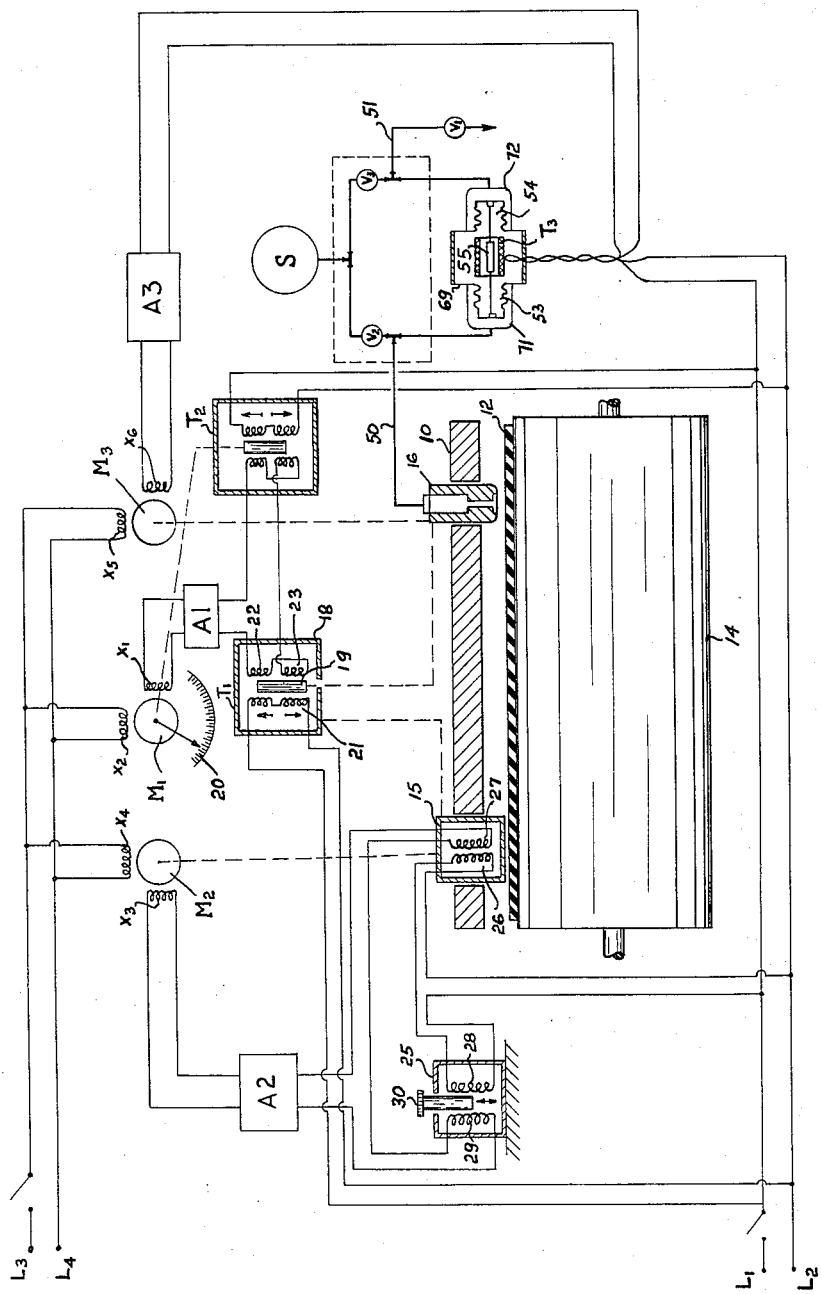
Fig. 1 is a combined schematic and diagrammatic representation of the measuring and control system of this invention as applied to strip material passing over a rolling support.
Figure 2:
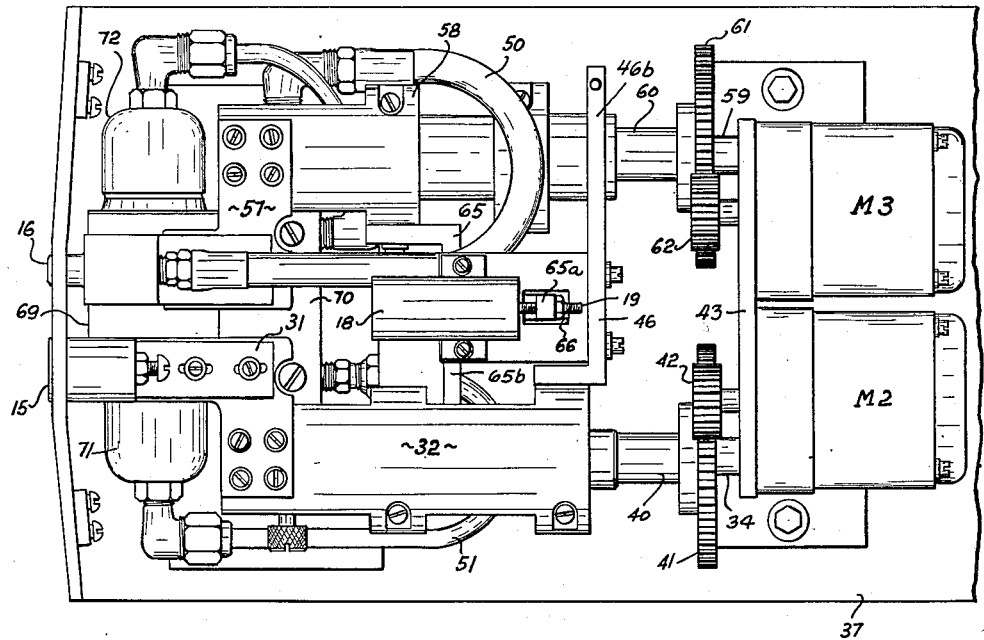
Fig. 2 is a plan view of a preferred form of mechanical apparatus for the system.
Figure 3:
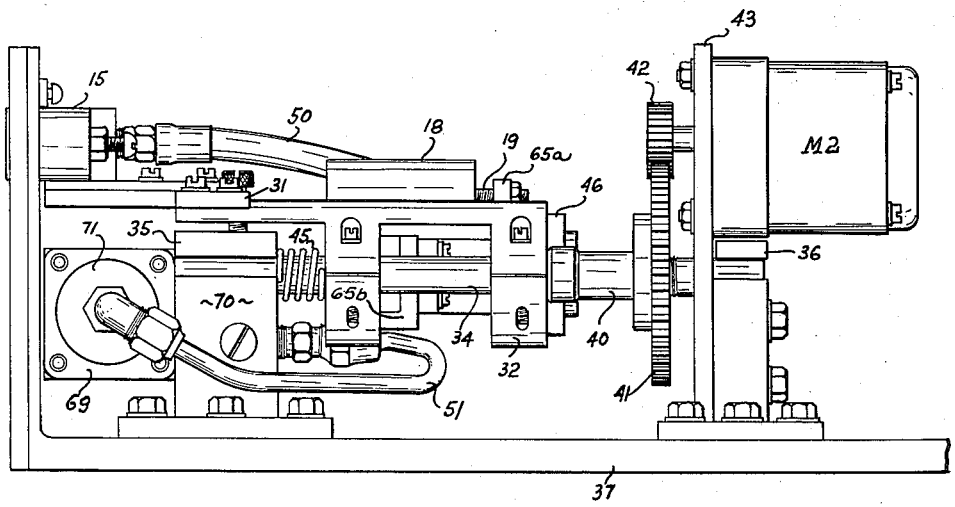
Fig. 3 is a side elevation of the mechanical apparatus of Fig. 2.

The measuring system illustrated in the combined schematic and diagrammatic form of Fig. 1 of the drawings is shown in part in Figs. 2 and 3 as an integral mechanical assembly carried on a suitable base to provide a unitary instrument in the form of a gaging head 10 which is intended to be supported in the exemplary illustration of Fig. 1 above the sheet material 12 passing over a moving roll or platen 14. The gaging head includes a magnetic follower and a fluid pressure follower spaced apart in a direction parallel to the axis of the material support; the heart of the former being a transmitter in the form of a movable core transformer 15 where the core is the magnetic support 14, while the control member of the fluid pressure portion is a nozzle 16 which directs a jet of fluid under pressure at the exposed surface of the sheet material.

It will be understood that the follower in each case could be of the direct contact type, such as a roller, whose relative position could be determined and translated into an indication of the location of one or both surfaces of the sheet material 12 relative to the other. However, as hereinbefore indicated, where direct contact is not practicable, remote followers of the magnetic and fluid pressure type are utilized. If these remote followers responded linearly to changes in the physical location of the corresponding material surfaces, their relative positions would directly reflect the physical distance between the opposed material surfaces. However, not only do the movable core transformer and nozzle back pressure respond in non-linear fashion, as is well known to those skilled in the art, but, their respective non-linear responses would ordinarily differ sufficiently to introduce error into the measurement. Therefore, in accordance with this invention, means are provided for maintaining the spacing of each remote follower from its corresponding surface constant and thereby providing a fixed reference in space for each follower independent of the other follower and of the respective surfaces.

Both the magnetic and fluid pressure followers are provided with separate control circuits which operate respectively in response to a change in the relative physical positions of the corresponding material surfaces to reposition either the magnetic transmitter 15 or the nozzle 16 and thereby maintain a constant spacing between them and the surface they are responsive to. Each of these control circuits is hereinafter described in greater detail in connection with its respective follower. Thus, the relative location of the transmitter 15 and nozzle 16 represent respectively the relative location of the surface to which they respond and the physical distance between them is an accurate indication of the thickness of the sheet material 12 which can be measured on a suitably calibrated dial or the like.

This is accomplished by mechanically coupling the transmitter 15 to the movable housing 18 of a conventional differential transformer T1. The movable core 19 of the differential transformer T1 is mechanically coupled to the nozzle 16. Thus, the relative positions of the coil housing 18 and movable core 19 correspond respectively to the relative positions of the transmitter 15 and the nozzle 16.

The primary coils 21 of T1 are coupled to a suitable source of alternating current through the lines L1, L2 and the two secondary coils 22 and 23 are connected in series with the windings reversed to provide output voltage 180° out of phase. The core 19 is located so that it can alter the relative flux distribution between the primary and two secondary coils, and motion of the core 19 toward either of the secondary coils 22 or 23 results in an increased output of the corresponding phase. If the secondary coils are identical and the core is located so that each receives an equal amount of flux, the voltages induced in the secondary coils would oppose each other equally and the total secondary output would be zero. The differential transformer T1 thus acts as a self-contained device for producing an electrical output which is isolated from the source of power and which may be controlled by adjustment of the flux distribution within the transformer.

The secondary output of the differential transformer T1 is in turn coupled in a null balance circuit 180° out of phase with the output of a similar differential transformer T2. The difference voltage is fed through an amplifier A1 to one phase X1 of a two-phase servomotor M1. The other phase X2 of this motor is energized continuously from the lines L3, L4. When both differential transformers are producing equal out-of-phase voltages, there will be no input to the amplifier and the motor M1 will be at rest. However, when the core 19 and/or housing 18 are displaced, as when the thickness of the material 12 varies to cause the transmitter 15 and/or nozle 16 to be repositioned, a restoring signal will be produced which will cause the motor M1 to rotate and return the null balance circuit to balance. This restoring signal is directly proportional to the change in the relative positions of the core 19 and housing 18, hence to the change in position of the transmitter 15 and nozle 16, and hence to the change in thickness in the sheet material 12. By attaching a suitable pointer or recorder to the shaft of motor M1, it can be made to indicate the thickness of the sheet material 12 on a suitably calibrated scale or chart 20; the mid-point of the scale corresponding to the central or zero position of the core 19. In the alternative, the motor M1 can be coupled to an extruder blade or the like to control the thickness of the sheet material 12 as it is delivered to the support 14.

*The magnetic follower*

The compensating circuit for the magnetic follower includes the transmitter 15 and another similar coil 25. The primaries 26 and 28 are connected in series across the supply lines L1, L2, while the respective secondaries 27 and 29 are coupled together in out-of-phase relation with the difference voltage fed through an amplifier A2 to one phase X3 of another two-phase servomotor M2, the other phase X4 being continuously energized from the line L3, L4. Thus, the servomotor M2 will rotate in either direction depending upon which output phase is dominant. The reference coil 25 is provided with an adjustable core 30 which can be positioned to balance the output of the transmitter 15 for any spacing from the support 14. The servomotor M2 is mechanically coupled to the transmitter 15 to physically reposition the transmitter in response to an unbalanced condition towards or away from the support 14 in a direction to maintain a constant spacing therebetween. The transmitter 15 thus automatically balances its own compensating circuit.

Referring now to Figures 2 and 3 of the drawings, the transmitter 15 is shown mounted on a bracket 31 which is carried by a split sleeve-like member 32. The sleeve 32 and transmitter 15 are adapted to be positioned in either direction axially along a rod 34. The rod 34 is fixed at each end respectively in saddle-clamps 35 and 36 carried by a suitable panel 37. One end of the rod 34 is externally threaded to engage the internal thread of an abutment sleeve 40. One end of the sleeve 40 carries a gear wheel 41 which meshes with a pinion 42 keyed on the shaft of the servomotor M2 mounted on a supporting bracket 43 carried by the panel 37. The other end of the sleeve 40 abuts against the adjacent end of the sleeve 32 and positions it axially away from the motor M2 when it rotates in one direction. A follower spring 45 coacts between the saddle clamp 35 and the other end of the sleeve 32 to position the sleeve in the opposite direction when the motor M3 is reversed. The housing 18 of differential transformer T1 is shown mounted on a plate 46a carried by a bracket 46 which is connected to the sleeve 32 and adapted to be positioned therewith. The servomotor M1, transformer T2, and the amplifiers A1 and A2 are preferably located remote from the gaging head assembly and are therefore not shown in Figs. 2 and 3.

*The fluid pressure follower*

The compensating circuit for the fluid pressure follower embodies a pair of conduit legs 50 and 51 having a common source S of fluid pressure which, in the preferred form shown, continuously supplies approximately five pounds of pneumatic pressure. One leg 50 of the conduit circuit terminates in the nozzle 16, while the other leg 51 terminates through a control valve V1 to the atmosphere. Additional control valves V2 and V3 are provided in each leg of the conduit circuit to equalize the pressure in each leg of the circuit. A differential pressure cell in the form of opposed bellows 53 and 54 are connected across the conduit legs 50 and 51. It is readily apparent that the position of the bellows will depend upon the condition of pressure in each leg 50 and 51 of the conduit bridge thus formed. The bellows 53 and 54 are each in turn mechanically coupled to opposite ends respectively of a movable core 55 of a differential transformer T3 so that an unbalanced pressure condition in the conduit bridge is reflected in terms of a corresponding electrical signal which is fed through an amplifier A3 to one-phase X6 of a two-phase servomotor M3, the other phase X5 being continuously energized from the line L3, L4. The servomotor M3 is mechanically coupled to the nozzle 16 to physically reposition the nozzle towards or away from the sheet material 12 in a direction to maintain a constant spacing therebetween. The nozzle 16 thus balances its own compensating circuit in a manner similar to the transmitter 15. Any unbalance in the pneumatic bridge due to changes in back pressure at the nozzle 16 because of changes in the position of the adjacent surface of the sheet material provides a control signal which operates the servomotor M3 to reposition the nozzle 16 in a direction to maintain its spacing from the adjacent surface of the sheet material constant.

Referring again to Figs. 2 and 3 of the drawings, the nozzle 16 is shown mounted on a bracket 57 which is carried by a split sleeve-like member 58 similar to the sleeve 32 which carries the transmitter 15. The sleeve 58 and nozzle 16 are also adapted to be axially positioned in either direction along a rod 59 which has its ends fixed respectively in the saddle clamps 35 and 36 in spaced parallel relation to the transmitter rod 34. One end of the rod 59 is also threaded to guide an internally threaded abutment sleeve 60. The sleeve 60 carries a gear wheel 61 at one end which meshes with a pinion 62 keyed on the shaft of the servomotor M3 which is likewise mounted on the supporting bracket 43. The other end of the sleeve 60 abuts against the adjacent end of the sleeve 58 and positions it axially away from the servomotor M3; a follower spring, not shown but similar to the spring 45, coacts with and urges the sleeve 58 in the opposite direction when the motor M3 is reversed. The core 19 of transformer T1 is adjustably connected to an arm 65 which is carried by the sleeve 58 and adapted to be positioned therewith. The arm 65 carries a bracket 65a which extends through an elongated aperture 66 in the plate 46a on the bracket 46 to permit relative movement between the coil housing 18 and the core 19. It will be noted also that in the preferred form shown, the bracket 46 and arm 65 each have extensions 65b and 46b which engage the opposite sleeves 58 and 32 respectively to prevent its carrier-sleeve from rotating on the corresponding supporting rod. It should also be noted that the size of the orifice of the nozzle 16 is designed to provide a sufficiently high escape velocity so that the back pressure at the nozzle is not appreciably affected by the speed of the moving sheet material 12.

The differential pressure cell including the bellows 53 and 54 is encased in a suitable housing 69 mounted on the panel 37 or on the fluid-tight valve chamber 70 which houses the pneumatic bridge circuit including the valves V1, V2 and V3 and which forms a part of the saddle-clamp 35. The conduit legs 50 and 51 are shown interconnected through the valve chamber 70 with the nozzle 16 and opposite ends of the bellows housing 69. The conduit connections to the bellows are made through suitable bell-shaped dust caps 71 and 72. The source of pneumatic pressure S and the amplifier A3 are preferably located remote from the gaging head assembly and are therefore not shown in Figs. 2 and 3.

In operation, the transmitter 15 is maintained at a constant distance from the material support 14 and the nozzle 16 is also maintained at a constant distance from the adjacent surface of the sheet material 12 so that any changes or variations in the thickness of the sheet material 12 can be independently measured in terms of the difference between the physical positions of the nozzle 16 and the transmitter 15. The physical difference in position between these two operative members is reflected through the servomotor M1 on the dial 20 which may be calibrated in terms of material thickness. To measure the material thickness the transmitter 15 and nozzle 16 are first zeroed in at the same distance from the material support 14; any change in their relative positions thereafter being an indication of material thickness. In the alternative, the measured signal could be transmitted to control mechanism for maintaining the thickness of the material constant or to perform other desired operations on the material. The initial positions of the transmitter 15 and of the nozzle 16 can be readily adjusted respectively by adjusting the core 30 or by adjusting the valve V1 in the discharge leg 51 of the pneumatic bridge.

Thus in accordance with this invention there is provided an improved arrangement for accurately measuring and/or controlling the thickness of moving sheet material, or other types of measurements in space, independently of sources of error external to the gaging head. The measurement may be made remote from the surfaces of the material and/or its support and independent of any fixed reference. The high sensitivity and flexibility of the system render it readily applicable to otherwise difficult or inaccessible subjects of measurement.

I have shown and described what I consider to be the preferred embodiment of my invention along with suggested modified forms and it is clear that other changes and modifications may be made by those skilled in the art without departing from the scope of my invention as defined by the appended claims.

I claim:

1. An apparatus for determining the thickness of a sheet comprising in combination, a supporting surface therefor, a pair of follower means, means movably supporting one of said follower means in predetermined spaced relation from the supported surface of the sheet, other means movably supporting the other follower means in predetermined spaced relation from the opposed parallel surface of the sheet, means coacting with said first supporting means to automatically maintain the predetermined spacing between the corresponding follower and the supported surface of the sheet, other means coacting with said other supporting means to automatically maintain the predetermined spacing between the corresponding follower and the opposed surface of the sheet, and means for determining the distance between the respective follower means less their predetermined spacing from the corresponding surfaces of the sheet along a line normal to the planes of the said surfaces of the sheet.

2. The apparatus of claim 1, wherein said last-mentioned means includes a differential transformer enclosed in a casing and having an externally accessible movable core, adapted to quantitatively vary the transformer voltage as the core and casing are displaced relative to each other, means for reducing the voltage to zero for one position of the core relative to the casing, and means coacting in response to the induced voltage to indicate the extent of displacement between the core and casing, said casing being connected for movement with one of said follower means and said core being connected for movement with the other of said follower means, thereby to indicate the distance between the respective follower means.

3. The apparatus of claim 1 wherein the sheet is of non-magnetic material and the supporting surface is of magnetically susceptible material, and wherein one of said space maintaining means includes a primary and secondary coil carried by one of said follower means, said supporting surface adapted to coact therewith as a movable core to vary the voltage induced in the secondary coil, means for reducing said secondary voltage to zero in response to the attainment of the predetermined spacing between the follower means and the supporting surface, and means coacting in response to said secondary voltage to move said follower means in a direction to maintain the predetermined spacing.

4. The apparatus of claim 2 wherein said indicating means includes a two phase servomotor having one phase coupled to the output of said differential transformer and having means coupled thereto to indicate the extent of rotation, and wherein said servomotor coacts with said voltage reducing means to balance the differential transfromer voltage to zero for the then attained position of the core following the indication of the displacement corresponding thereto.

5. The apparatus of claim 1, wherein one of said space maintaining means includes a nozzle carried by one of said follower means adjacent one of the surfaces, means for continuously passing fluid through said nozzle, said one surface adapted to obstruct and coact with the fluid passing through said nozzle to create a back pressure corresponding to the extent of obstruction, means for balancing said back pressure in response to the attainment of the predetermined spacing between the follower means and said one surface, and means coacting in response to an unbalanced back pressure to move said follower means in a direction to maintain the predetermined spacing.

6. A gaging head comprising in combination, a panel, a pair of rods supported in spaced parallel relation on said panel, a sleeve slidably mounted on each rod, an independent follower device carried by each sleeve and movable therewith respectively along the corresponding rod, a differential fluid pressure device on the panel including a housing enclosing flexible fluid impervious means, a valve casing on the panel, conduit means selectively interconnecting the valve casing with the housing at opposite sides of said flexible means, and independent means carried by the panel for selectively positioning each of said sleeves respectively in either direction along the corresponding rod.

7. In an apparatus for indicating variations from a predetermined surface plane of a sheet on a relatively movable support of magnetically susceptible material, means for movably supporting a follower device a predetermined spaced distance from the supporting plane of said magnetic support, said follower device including a first primary and secondary coil, the voltage induced in the secondary coil being quantitatively determined by the position of the supporting plane of said magnetic support relative thereto, means for reducing the secondary voltage to zero in response to the attainment of the predetermined spacing between the follower device and the supporting plane of said magnetic support, and means quantitatively coacting in response to said secondary voltage to move the follower device in a direction and amount sufficient to maintain the predetermined spacing during movement of the support.

8. The apparatus of claim 7 wherein said voltage reducing means includes a second primary and secondary coil having an adjustable core and wherein the respective secondary coils are connected in series opposing relation, said core being adjusted to provide voltage at said second secondary coil equal and opposite to the voltage of said first secondary coil in response to the attainment of the predetermined spacing between the follower device and the magnetic support.

9. The apparatus of claim 7 wherein said last mentioned means includes a two-phase servomotor having one phase coupled to said secondary coil and wherein said follower means is operatively coupled for linear movement in response to rotation of the servomotor shaft.

10. In an apparatus for indicating variations from a predetermined surface plane of a relatively movable sheet on a support, means for movably supporting a follower device a predetermined spaced distance from one of said surfaces, said follower device including a nozzle, means for passing fluid through the nozzle for discharge against said one surface, said one surface adapted to obstruct and coact with the fluid passing through the nozzle to create a back pressure corresponding to the extent of obstruction, means for balancing said back pressure in response to the attainment of the predetermined spacing between the follower device and said one surface, and means quantitatively coacting in response to said back pressure to move said follower device in a direction and amount sufficient to maintain the predetermined spacing.

11. The apparatus of claim 10 wherein said balancing means includes a second path for the fluid having a control valve therein and flexible means isolating one path from the other, said control being adjustable to balance the pressure on opposite sides of said flexible means in response to the attainment of the predetermined spacing between the follower device and said one surface.

12. The apparatus of claim 10 wherein said last mentioned means includes means for quantitatively translating the back pressure into a corresponding electrical signal and also includes a two-phase servomotor having one phase coupled to said signal, and means for moving said follower device linearly in response to rotation of the servomotor shaft.

13. A gaging head comprising in combination, a panel, a rod supported on the panel, a sleeve slidably mounted on the rod, a fluid nozzle carried by said sleeve and movable therewith along the rod, a differential fluid pressure device on the panel, including a housing enclosing flexible fluid impervious means, a valve casing on the panel, conduit means selectively interconnecting the valve casing with the housing at opposite sides of said flexible means, and means carried by the panel for selectively positioning said sleeve in either direction along the rod.

14. An apparatus for determining the thickness of a sheet comprising, in combination, a pair of follower means, means independently supporting each of said follower means in predetermined spaced relation from the sheet, means automatically operative in response to a change in spacing between one of said follower means and one surface of the sheet to maintain the spacing therebetween constant, other means automatically operative in response to a change in spacing between the other follower means and the opposed parallel surface of the sheet to maintain the spacing therebetween constant, and means for determining the distance between the respective follower means less their predetermined spacing from the corresponding surfaces of the sheet along a line normal to the planes of the surfaces of the sheet.

References Cited in the file of this patent

UNITED STATES PATENTS

| | | |
|---|---|---|
| 2,398,958 | Pellettere | Apr. 23, 1946 |
| 2,399,305 | Agnew et al. | Apr. 30, 1946 |
| 2,481,345 | Reynst | Sept. 6, 1949 |
| 2,583,791 | Neff | Jan. 29, 1952 |
| 2,640,190 | Rines | May 26, 1953 |
| 2,641,841 | Ladrach | June 16, 1953 |
| 2,676,298 | Frommer | Apr. 20, 1954 |
| 2,756,586 | Nash | July 31, 1956 |